US006517295B2

(12) United States Patent
Lin

(10) Patent No.: US 6,517,295 B2
(45) Date of Patent: Feb. 11, 2003

(54) POWER DRILL HOUSING AND CHUCK ROTATION

(76) Inventor: Yuan-Ho Lin, 206-12, Sec. 1, Kuo Kuang Rd., Ta Li City, Taichung Hsien (TW)

( * ) Notice: Subject to any disclaimer, the term of this patent is extended or adjusted under 35 U.S.C. 154(b) by 73 days.

(21) Appl. No.: 09/853,789

(22) Filed: May 14, 2001

(65) Prior Publication Data

US 2001/0048855 A1 Dec. 6, 2001

(30) Foreign Application Priority Data

May 15, 2000 (CN) ...................................... 00206988 U

(51) Int. Cl.[7] ................................................ B23B 45/02
(52) U.S. Cl. ......................... 408/16; 408/710; 279/125; 279/157
(58) Field of Search .......................... 408/16, 124, 139, 408/710; 279/125, 127

(56) References Cited

U.S. PATENT DOCUMENTS

| | | | | |
|---|---|---|---|---|
| 4,323,324 | A | * | 4/1982 | Eberhardt |
| 4,669,932 | A | * | 6/1987 | Hartley |
| 4,682,918 | A | * | 7/1987 | Palm |
| 5,195,760 | A | * | 3/1993 | Wheeler et al. |
| 6,179,301 | B1 | * | 1/2001 | Steadings et al. |
| 6,296,427 | B1 | * | 10/2001 | Potter et al. |

* cited by examiner

*Primary Examiner*—William M. Pierce
(74) *Attorney, Agent, or Firm*—Charles E. Baxley

(57) ABSTRACT

A power drill housing and chuck rotation indicator arrangement in which the power drill housing is formed of two symmetrical shells abutted against each other, the shells each having a front end terminating in a chuck guard defining a respective semi-circular mouth adapted to receive the chuck assembly of the power drill, keeping the chuck assembly protected within the chuck guards.

6 Claims, 9 Drawing Sheets

POWER DRILL HOUSING AND CHUCK ROTATION

BACKGROUND OF THE INVENTION

1. Field of the Invention

The present invention relates to a power drill and, more specifically, to a power drill housing and chuck rotation indicator arrangement, which has means to protect the chuck assembly, and means to indicate the direction of rotation of the chuck assembly.

2. Description of the Prior Art

In a regular power drill, as shown in FIG. 1, the chuck assembly is directly fastened to the power drill by a screw joint for rotation by the output shaft of the power drill. Because the chuck assembly is exposed to the outside of the power drill, the user must carefully hold the power drill when using it, preventing direct touch of hand with the chuck assembly. Further, during drilling, waste workpiece chips may be carried with the chuck assembly out of the workpiece to further injure the user.

SUMMARY OF THE INVENTION

The invention has been accomplished under the circumstances in view. It is the main object of the present invention to provide a housing for a power drill, which has means to protect the chuck assembly of the power drill, preventing the user's hand from touching the chuck assembly accidentally. It is another object of the present invention to provide indicator means for a power drill, which indicates the direction of rotation of the chuck assembly during the operation of the power drill. According to one aspect of the present invention, the power drill housing is formed of two symmetrical shells abutted against each other, the shells each having a front end terminating in a chuck guard defining a respective semi-circular mouth adapted to receive the chuck assembly of the power drill, keeping the chuck assembly protected within the chuck guards. According to another aspect of the present invention, two light emitting elements of different colors are installed in the housing and controlled by the controller of the power drill to emit light for the indication of forward/backward rotation of the chuck assembly respectively.

DETAILED DESCRIPTION OF THE PREFERRED EMBODIMENT

Figure 1:
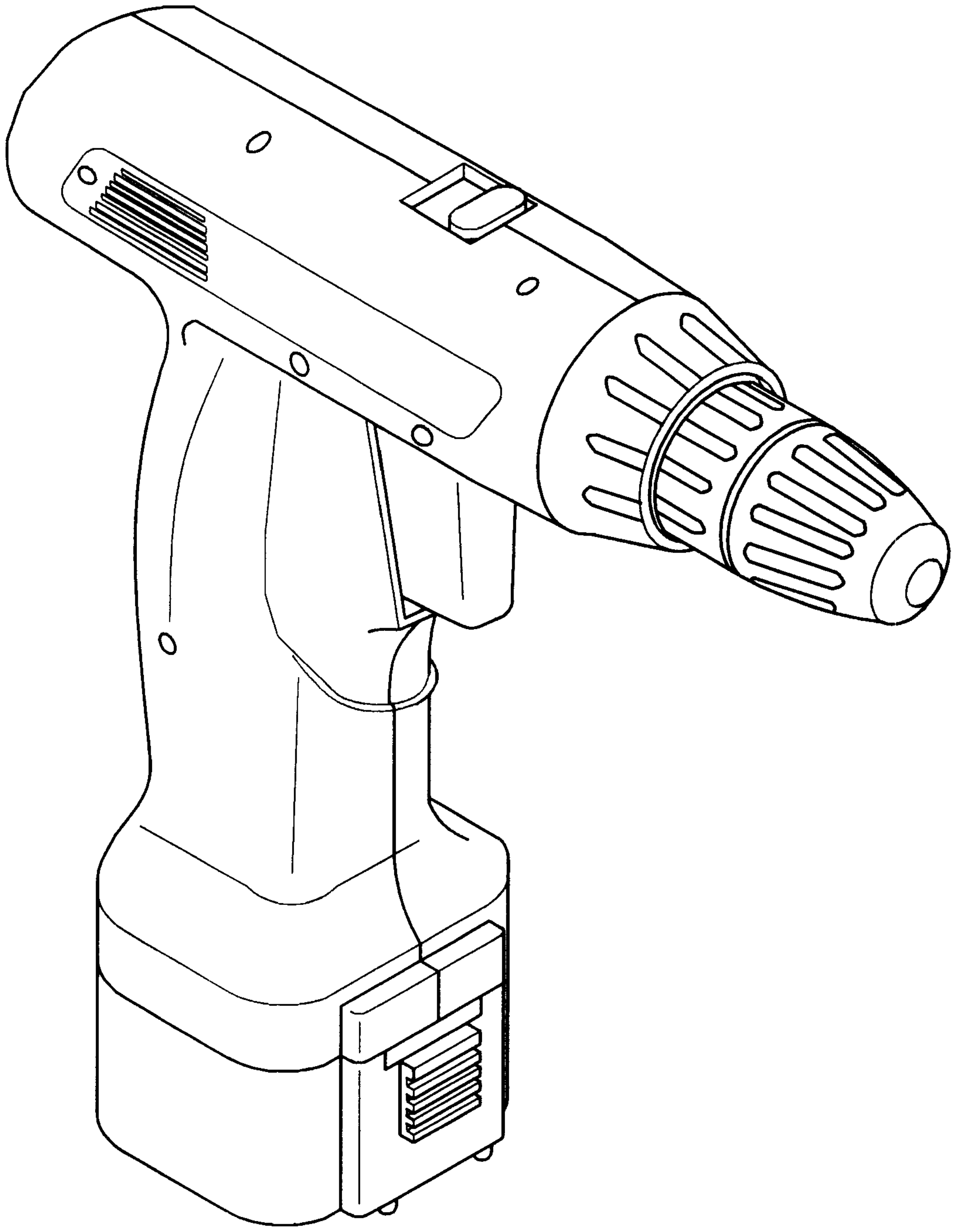
Fig. 1 PRIOR ART
FIG. 1 is a perspective view of a power drill according to the prior art.
Figure 2:
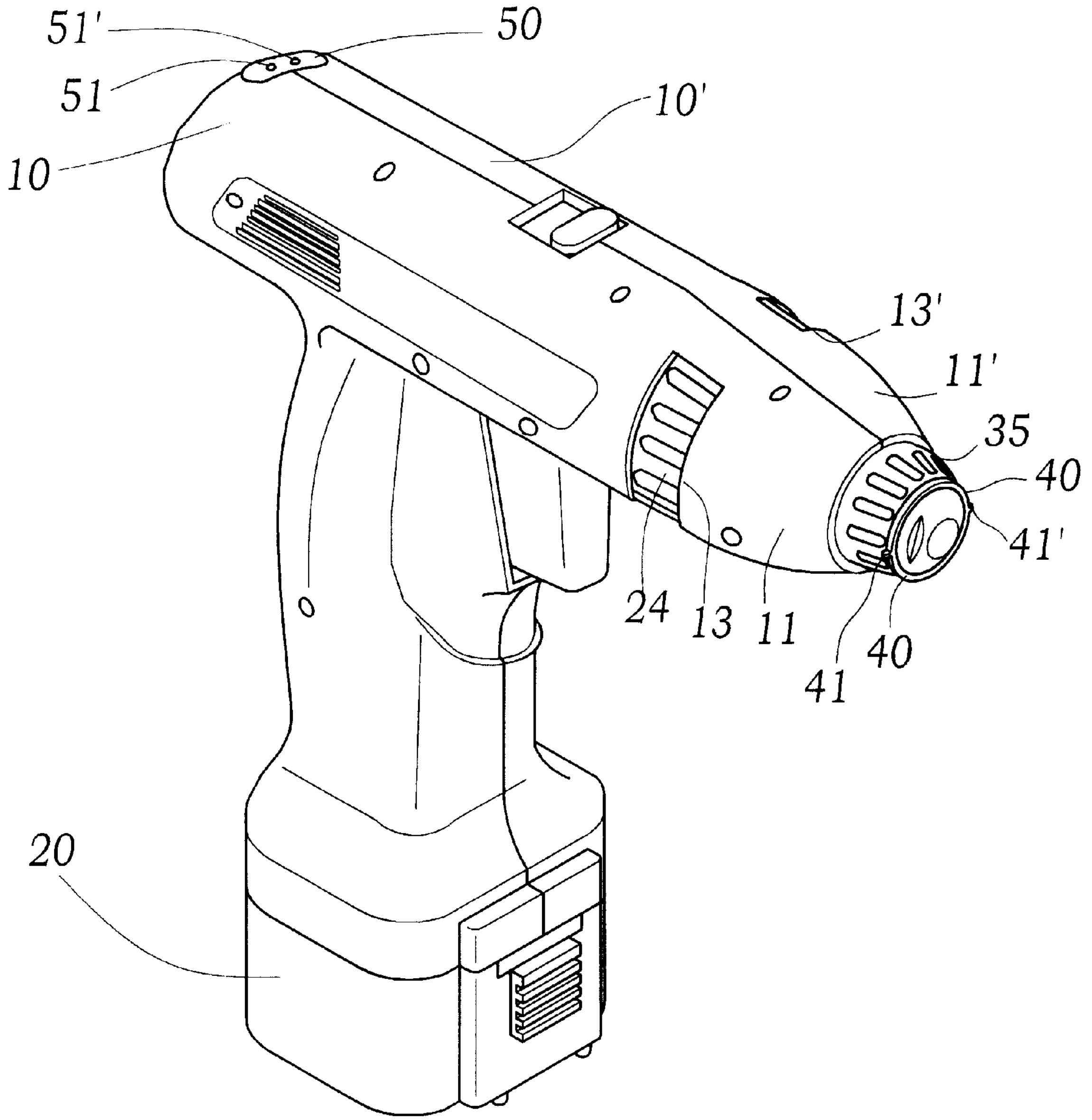
FIG. 2 is an elevational view of the present invention.
Figure 3:
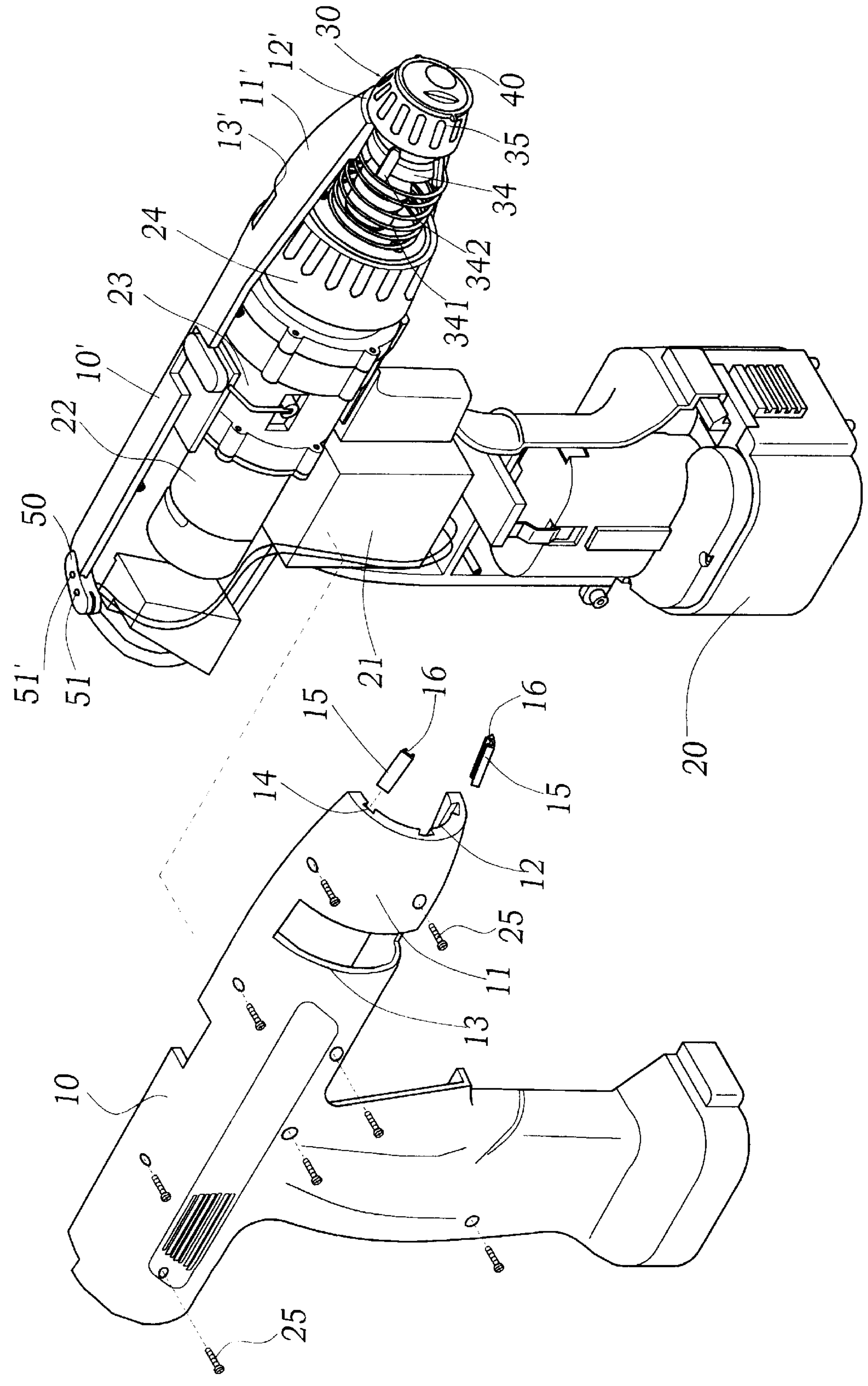
FIG. 3 is an exploded view of FIG. 2.
Figure 4:
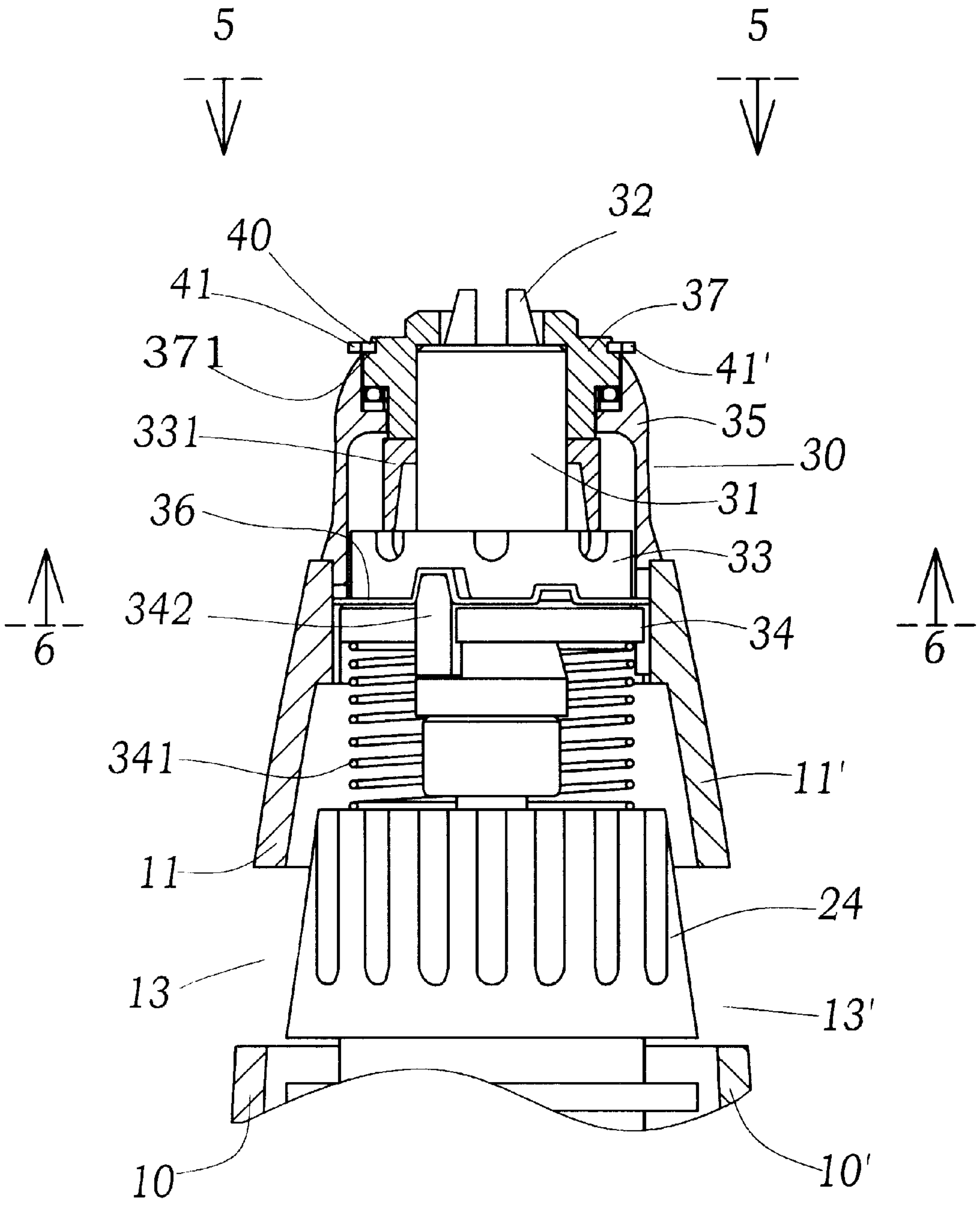
FIG. 4 is a sectional view in an enlarged scale of a part of FIG. 2.

Referring to FIGS. 2~4, a power drill housing in accordance with the present invention is shown comprised of a first shell 10 and a second shell 10'. The first shell 10 and the second shell 10' are respectively disposed at the left side and the right side and abutted against each other, defining a holding space, which holds a battery case 20, a controller 21, a motor 22, a transmission gear set 23, a torque adjustment ring 24, and a chuck assembly 30.

The first shell 10 and the second shell 10' each have a front end terminating in a chuck guard 11 or 11', defining a respective semi-circular mouth 12 or 12'. Tie screws 25 are fastened to the shells 10 and 10' to secure the shells 10 and 10' together, keeping the chuck assembly 30 received in the circular space formed of the semi-circular mouths 12 and 12' within the chuck guards 11 and 11' for protection. The chuck guards 11 and 11' each have an opening 13 or 13' to which the torque adjustment ring 24 is exposed for turning by hand, and a plurality of sliding groove 14 or 14' longitudinally disposed on the inside facing the respective semicircular mouth 12 or 12'. A plurality of metal slides 15 are respectively slidably mounted in the sliding grooves 14 and 14', each having a longitudinal sliding groove 16.

The chuck assembly 30 is comprised of a body 31, a plurality of jaws 32, a screw holder 33, a protective ring 331, a spring 341, an impact ring 34, a chuck (shell) 35, a friction ring 36, and a collar 37. The impact ring 34 has teeth 342 respectively slidably coupled to the sliding groove 16 of each of the metal slides 15 to prohibit the impart ring 34 from rotary motion. The chuck assembly 30 is described in detail in Taiwan Patent No. 88214119, issued to the present inventor.

The chuck guards 11 and 11' surround the chuck assembly 30, keeping the chuck assembly 30 received within the chuck guards 11 and 11', so that much hand operation area is provided for the holding of the hand to stably operate the power drill, and less area of the chuck assembly 30 is exposed to the outside, preventing sticking of metal dust.

Figure 5:
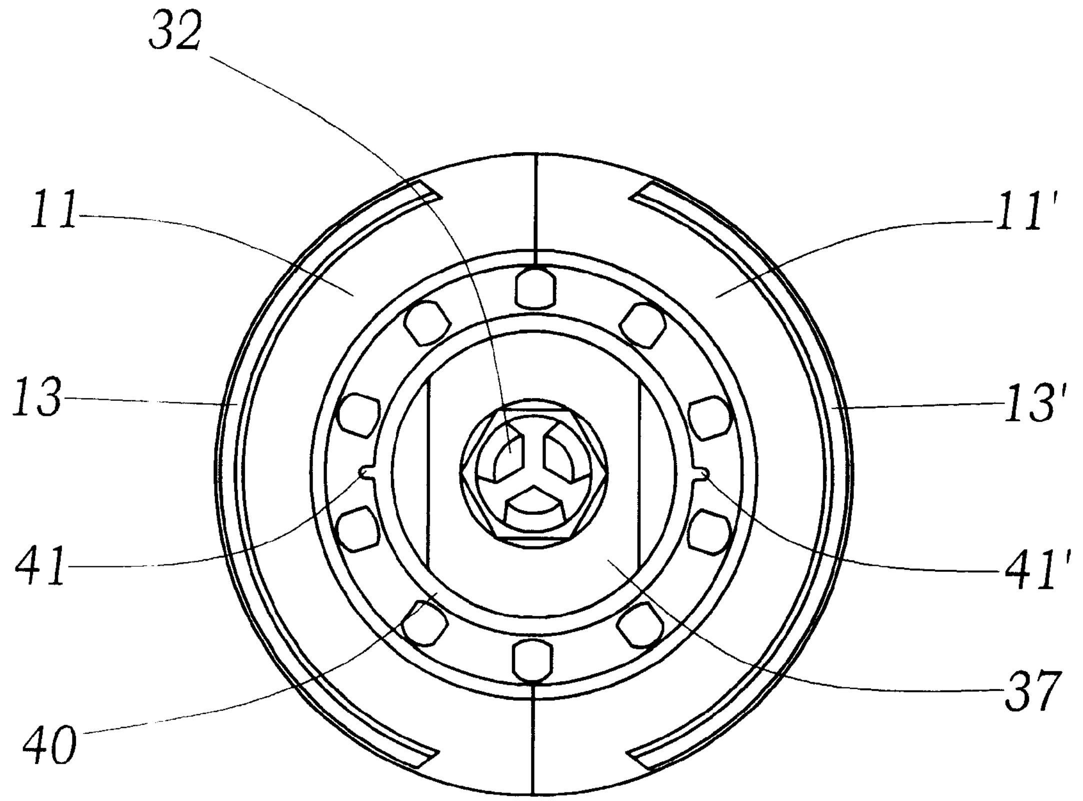
FIG. 5 is a sectional view taken along line 5—5 of FIG. 4.
Figure 6:
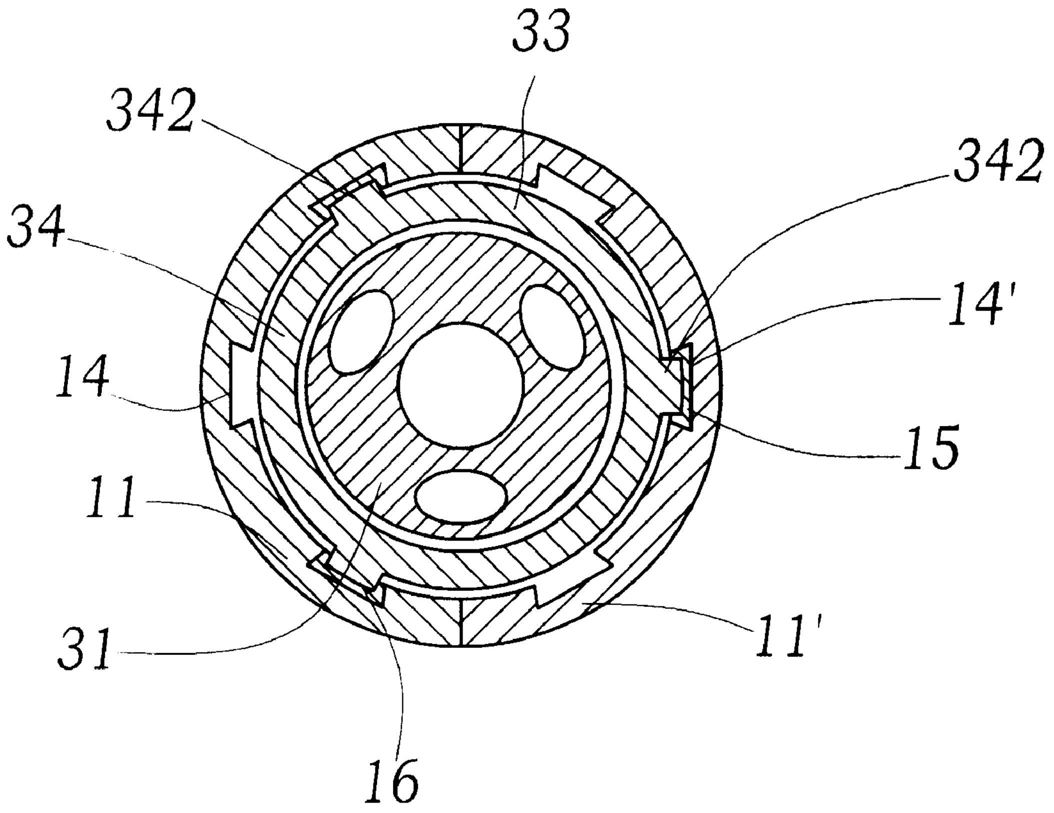
FIG. 6 is a sectional view taken along line 6—6 of FIG. 4.
Figure 7:
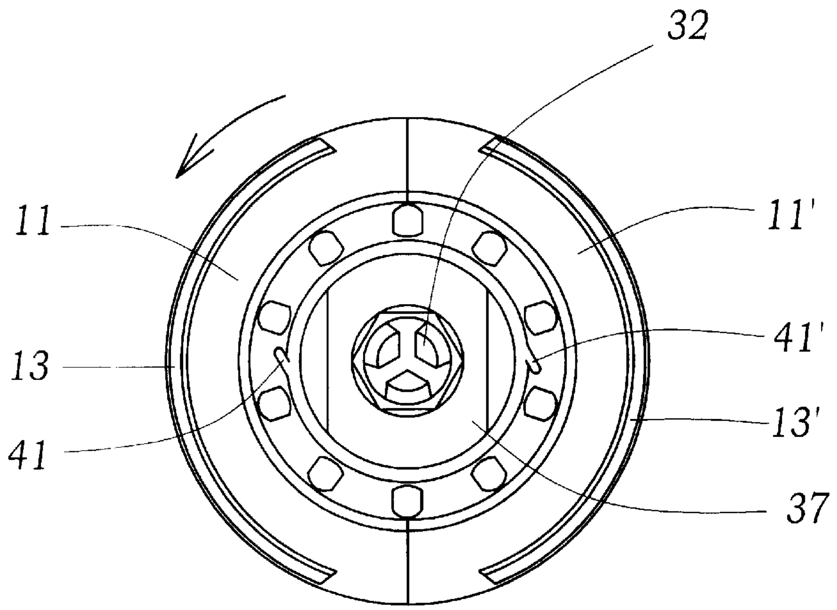
FIG. 7 is similar to FIG. 5 but showing the chuck assembly rotated counter-clockwise.
Figure 9:
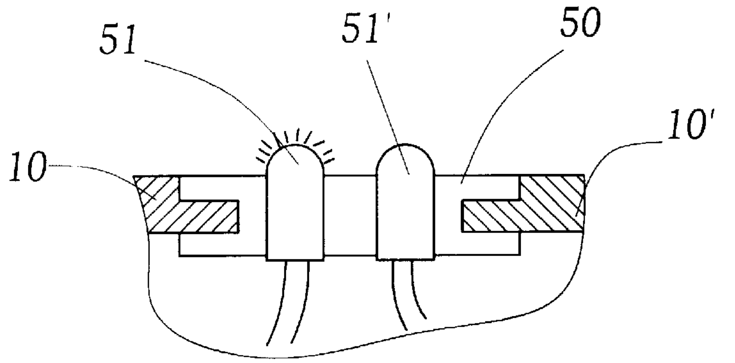
FIG. 9 illustrates one indication status of the indicator light unit according to the present invention.
Figure 8:
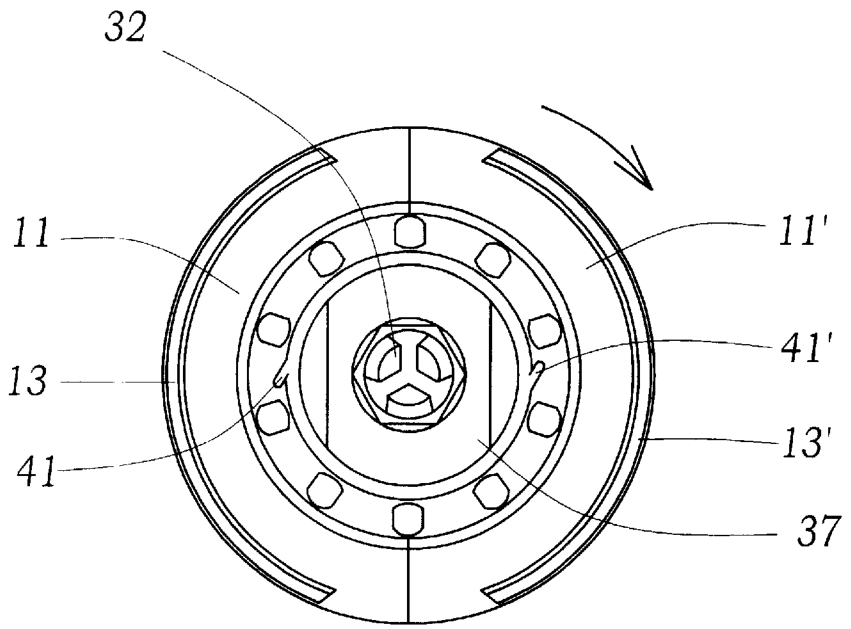
FIG. 8 is similar to FIG. 5 but showing the chuck assembly rotated clockwise.
Figure 10:
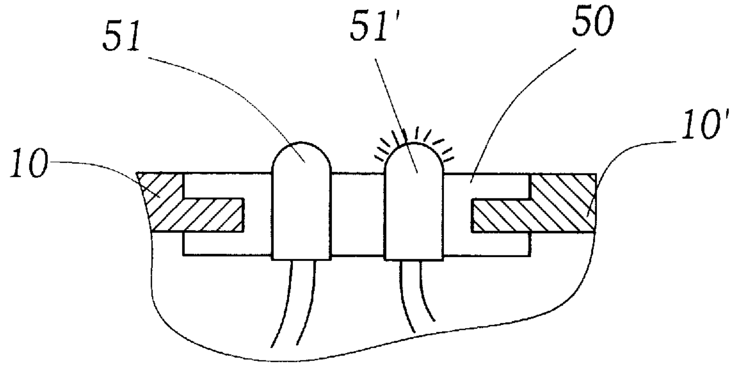
FIG. 10 illustrates another indication status of the indicator light unit according to the present invention.

When assembled, the chuck assembly 30 is received within the chuck guards 11 and 11' with the chuck 35 exposed to the outside for adjustment between the normal operation mode and the impact operation mode. Further, a direction indicator ring 40 (see FIG. 5) and an indicator light unit 50 (See FIG. 3) are provided. The direction indicator ring 40 is made of rubber, and mounted in a locating groove 371 around the peripheral wall of the collar 37, having two lugs 41 and 41' extended from the periphery thereof at two sides (See FIGS. 4 and 5). As illustrated in FIGS. from 7 through 10, the lugs 41 and 41' each have two sides colored with two different colors. During forward/backward rotation of the chuck assembly 30, the lugs 41 and 41' are forced by centrifugal force to tilt in reversed direction, giving a particular color indication. The indicator light unit 50 comprises two light emitting elements 51 and 51' of different colors respectively connected to the controller 21. The controller 21 alternatively turns on the light emitting elements 51 and 51' subject to the direction of rotation of the chuck assembly 30 during the operation of the power drill. The colors of the lugs 41 and 41' correspond to the colors of the light emitting elements 51 and 51' for easy recognition.

Figure 11:
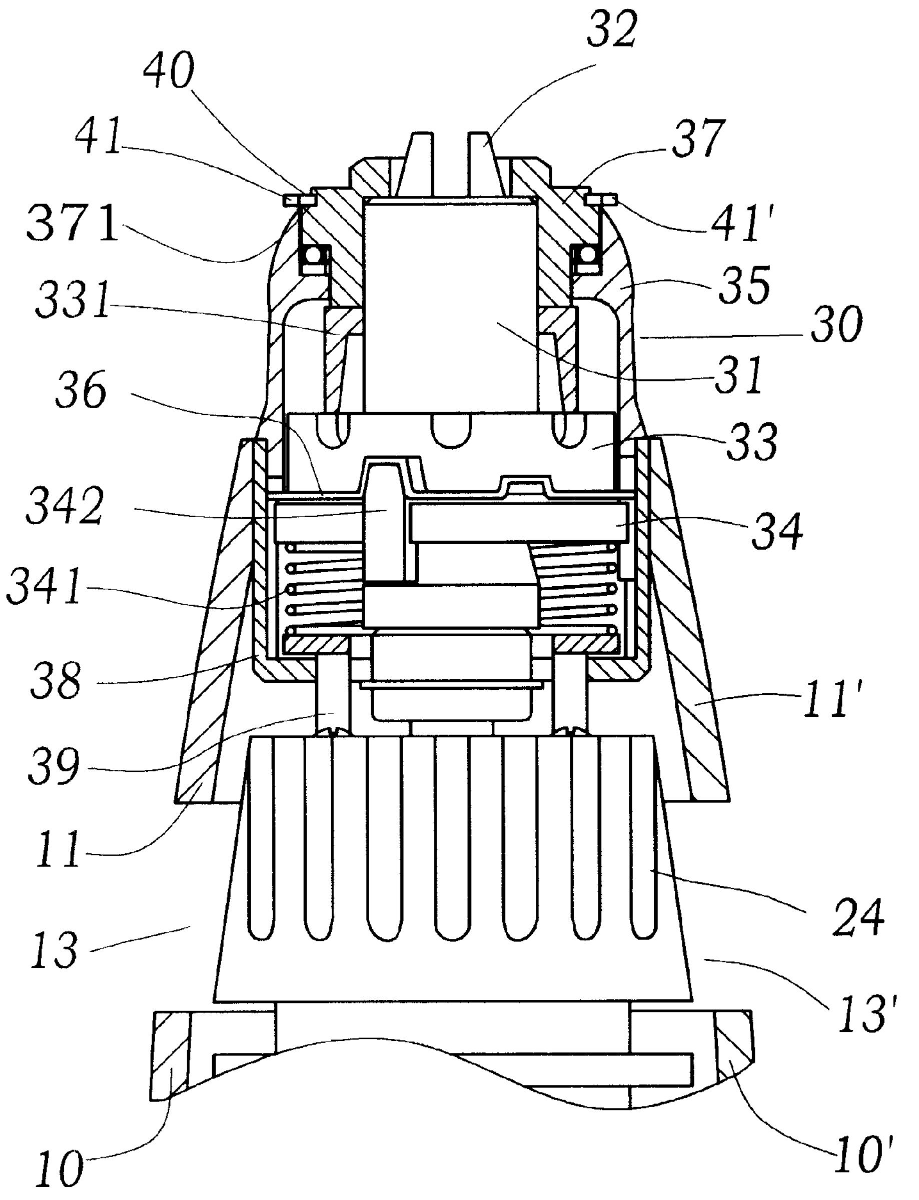
FIG. 11 is a sectional view of a part of an alternate form of the present invention.

As indicated above, the present invention uses chuck guards 11 and 11' to protect the chuck assembly 30, a direction indicator ring 40 and a light indicator unit 50 to indicate the direction of rotation of the chuck assembly 30. Further, the chuck assembly 30 can be of double-shell design (matched with a lower shell 38 and a connecting block 39 as shown in FIG. 11).

A prototype of power drill housing has been constructed with the features of FIGS. 2~11. The power drill housing functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A power drill housing and chuck rotation indicator arrangement comprising a housing used in a power drill comprised of a battery case, a controller, a motor, a transmission gar set, a torque adjustment ring, and a chuck assembly, wherein said power drill housing comprises a first shell and a second shell abutted against each other and fixedly fastened together by fastening elements to hold the battery case, controller, motor, transmission gar set, torque adjustment ring and chuck assembly of the power drill on the inside, said first shell and said second shell each having a front end terminating in a chuck guard defining a respective semi-circular mouth adapted to receive said chuck assembly, keeping said chuck assembly protected within said chuck guards.

2. The power drill housing and chuck rotation indicator arrangement of claim 1 wherein said chuck guards each have an opening corresponding to the torque adjustment ring of the power drill.

3. The power drill housing and chuck rotation indicator arrangement of claim 1 further comprising a direction indicator ring mounted on said chuck assembly adapted to indicate the direction of rotation of said chuck assembly, said direction indicator ring comprising two flexible lugs extended from the periphery thereof at two sites, said lugs each having two sides colored with two different colors.

4. The power drill housing and chuck rotation indicator arrangement of claim 3 wherein said direction indicator ring is made of rubber.

5. The power drill housing and chuck rotation indicator arrangement of claim 3 further comprising a light indicator unit, said light indicator unit comprising two light emitting elements of different colors controlled by the controller of the power drill to emit light for the indication of forward/backward rotation of the chuck assembly respectively.

6. The power drill housing and chuck rotation indicator arrangement of claim 5 wherein the two colors of said lugs of said direction indicator ring correspond to the two colors of said light emitting elements.

* * * * *